United States Patent [19]

Schwartz et al.

[11] Patent Number: 4,720,143
[45] Date of Patent: Jan. 19, 1988

[54] EASY ENTRY ASSIST MECHANISM FOR VEHICLE PIVOTAL SEAT

[75] Inventors: Martin T. Schwartz, Glenview, Ill.; Mariano T. Cadiz, Ann Arbor, Mich.; Eric G. Clark, Utica, Mich.; Neville G. D'Souza, Troy, Mich.; Walter D. Talley, III, Mt. Clemens, Mich.; Matthew E. Dukatz, Bloomfield Hills, Mich.

[73] Assignee: Chrysler Motors Corporation, Highland Park, Mich.

[21] Appl. No.: 58,412

[22] Filed: Jun. 5, 1987

[51] Int. Cl.$^4$ .............................................. B60N 1/02
[52] U.S. Cl. .................................... 297/326; 297/332; 296/65 R
[58] Field of Search ............... 297/326, 325, 332, 335, 297/341, DIG. 10; 296/65 R

[56] References Cited

U.S. PATENT DOCUMENTS

| | | | |
|---|---|---|---|
| 1,747,329 | 2/1930 | Smith | 297/326 |
| 3,572,818 | 3/1971 | Lohr | 296/65 R |
| 4,372,607 | 2/1983 | Mizushima et al. | 296/65 R |
| 4,408,798 | 10/1983 | Mizushima et al. | 297/326 |
| 4,573,736 | 3/1986 | Levenberg | 297/DIG. 10 |
| 4,657,257 | 4/1987 | Lubeck | 297/332 |

Primary Examiner—Francis K. Zugel
Attorney, Agent, or Firm—Edward P. Barthel

[57] ABSTRACT

A gas spring assisted latch assembly for an automotive vehicle seat structure which tilts the seat forwardly to an easy entry position without passenger assistance upon release of the latch. An extensible and retractable gas spring actuator is provided constantly biased toward its extended position. The actuator, which has its one end pivotally connected to the seat riser and its other end pivotally connected to the vehicle floor, is held in its retracted position by a latch mechanism releasably locking the seat structure in its upright mode. Release of the latch mechanism allows the actuator to apply a constant pushing force pivoting the seat to its forwardly tilted position. An improved dual actuated latch mechanism provides an alternative outboard side latch release handle for ready access from outside the vehicle in combination with an existing rear latch release handle.

4 Claims, 8 Drawing Figures

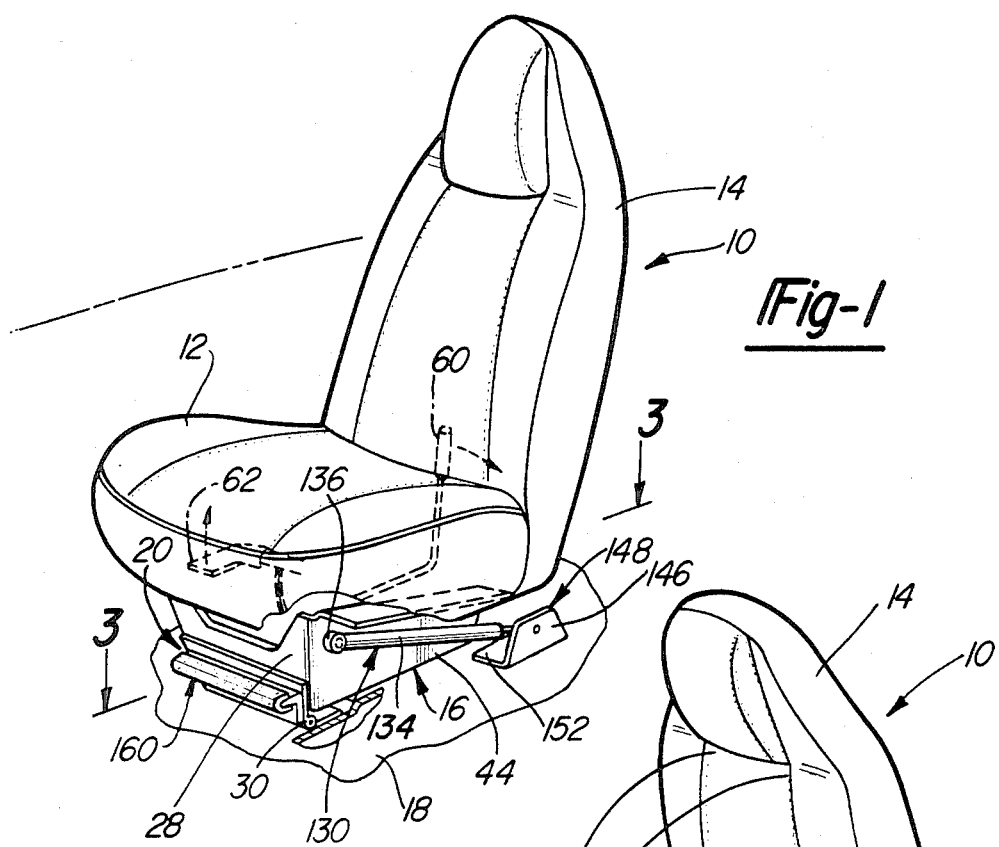
Fig-1
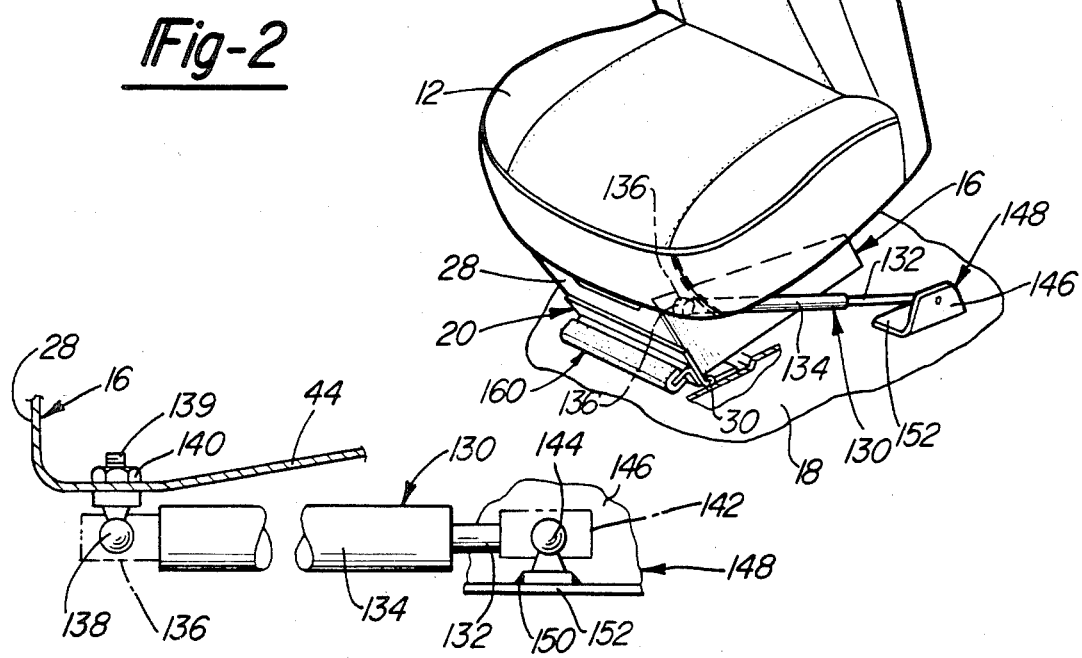
Fig-2
Fig-3

EASY ENTRY ASSIST MECHANISM FOR VEHICLE PIVOTAL SEAT

BACKGROUND OF THE INVENTION

The present invention relates generally to a vehicle seat structure for use with passenger vehicles and more particularly to a gas spring assisted latch assembly which upon release tilts a vehicle seat structure forwardly without passenger assistance providing easier access to selected areas of the vehicle.

The U.S. Pat. No. 4,408,798 to Mizushima et al discloses one form of a seat structure applicable for two-door type vehicles in which a front seat is manually inclinable for forming a passage allowing passenger seating in the rear seat area of the vehicle. In the Mizushima et al structure a pair of rear seat support legs are releasable from the floor panel and pivotally secured to the seat. Actuation means operates to fold the rear legs below the seat in response to inclining the front seat providing easier access to the rear seat area. The Mizushima patent is representative of prior art tiltable seat structures wherein the operation is inconvenient in that a rear seat passenger is required to manually tilt the seat structure forwardly while getting in or out of the vehicle. Also, in cases where the vehicle is parked on an upward grade, for example, it may be necessary for an entering or exiting rear seat passenger to hold the seat in its forwardly tilted position if the pivoted seat's center of gravity is not located overcenter of its pivot axis.

SUMMARY OF THE INVENTION

Accordingly, it is a general object of the present invention to provide an improved compact gas spring assisted latch arrangement for a vehicle seat structure which upon release tilts the seat forwardly without passenger assistance.

Another object of the present invention is to provide a compact self-contained extensible and retractable gas spring actuator assisted latch arrangement which, upon release, rotates a vehicle seat structure from an upright floor latched seating position to a forwardly tilted easy entry position without user assistance, and which maintains the seat structure in the forwardly tilted position while allowing the passenger to manually return the seat to its upright latched position with minimal effort.

A further object of the present invention is to provide an improved gas spring assisted latch assembly for a vehicle seat structure as set forth above wherein the seat may be readily unlatched by means of a dual release latch mechanism commonly operable by a rear latch release handle, easily accessible to both a rear seat passenger and the driver, or an outboard side latch release handle easily accessible to a user outside the vehicle.

The seat structure is normally latched to the vehicle floor in its upright position. An extensible and retractable gas spring actuator has its one end pivotally connected to a forward portion of the seat riser and its other end pivotally connected to the vehicle floor. The actuator, which is constantly biased toward its extended position, is maintained in its retracted mode by the engaged latch. Release of the latch allows the actuator to rotate the seat forwardly about a transverse pivot axis to a predetermined inclined position wherein a stop member on the seat riser contacts the vehicle floor. In this predetermined inclined position the seat center of gravity is slightly overcenter of the pivot axis with the vehicle located on a substantially level surface. The system is arranged so that as the gas spring actuator approaches its fully extended position the seat riser stop member contacts the vehicle floor avoiding fully extending the actuator thereby minimizing actuator stress. Further, the gas spring actuator maintains the seat structure in its forwardly tilted position even when the vehicle is parked on a steep grade wherein the seat structure center of gravity may not be overcenter of the seat pivot axis. It will be noted that the stop member is designed to prevent possible overtravel of the seat structure thus insuring that the seat structure will not contact any interior portions of the vehicle passenger compartment during its forward tilting movement.

A modified latch assembly incorporates a bell-crank having its one arm extending outboard through an opening in the seat riser with the bell-crank's other arm extending vertically within the seat riser. The bell-crank vertical arm is connected by an actuator rod to an operating link of the latch mechanism. Thus, a user outside the vehicle may conveniently lift a handle portion of the bell-crank outboard arm to release the latch mechanism allowing the gas spring actuator to tilt the seat forward to its easy enter position. The rear seat latch release handle allows rear seat passengers or the driver to release the latch mechanism.

These and other objects and advantages of the present invention will be apparent when references is made to the following description and accompanying drawings.

BRIEF DESCRIPTION OF THE DRAWINGS

FIG. 1 is a perspective view of a preferred embodiment of a vehicle front seat structure according to the present invention shown locked in its normal upright position;

FIG. 2 is a view similar to FIG. 1 showing the seat structure tilted forwardly to its easy enter position;

FIG. 3 is a fragmentary top elevational plan view, partly in cross-section, taken substantially on the line 3—3 of FIG. 1 showing the gas spring actuator in its retracted mode;

DETAILED DESCRIPTION OF THE PREFERRED EMBODIMENT

Referring to FIG. 1 of the drawings a fixed-back seat structure 10 according to the invention is shown, for purposes of description, positioned in the front or forward portion of the passenger compartment of a motor vehicle on the passenger side. Thus, the near side of the seat 10 in FIG. 1 is the inboard side of the vehicle. Vehicle seats of this type are often referred to as or "dump seats" in the automotive industry. Reference may be had to the aforementioned U.S. Pat. No.

4,408,798 to Mizushima et al showing a two-door type automotive vehicle having only front doors in which the present structure seat assist mechanism may be used. It will be noted that while the present invention is disclosed in conjunction with a fixed-back seat structure it will be understood that the invention could be used with other types of seats such as reclinable seats, for example, without departing from the scope of the invention. Further, the invention has equal application to vehicle seats located in other parts of the vehicle including a drivers seat structure. Other examples would be with an intermediate seat structure adjacent a rear sliding door of a van type vehicle or a swival type seat structure.

Figure 4:
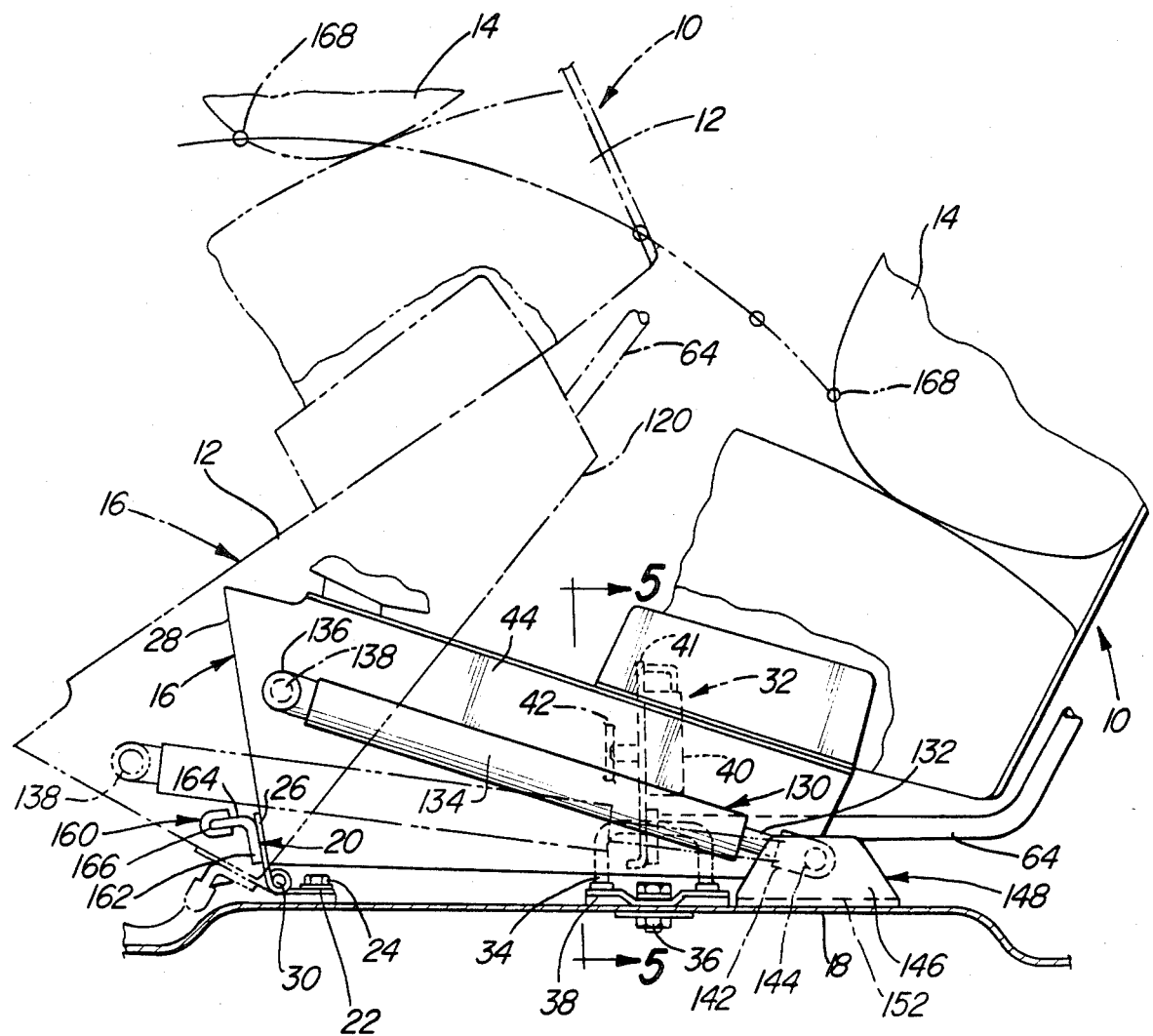
FIG. 4 is a fragmentary elevational view, partly in cross section, showing the inboard side of the seat structure of FIG. 1.

The fixed-back seat structure 10 comprises a seat cushion 12 permanently connected to seat back 14. A seat support frame or riser, generally indicated at 16, is secured to the underside of the seat cushion 12. As best seen in FIG. 4, the riser 16 is secured to vehicle body floor 18 by means of a hinge generally indicated at 20. The hinge 20 has a lower hinge plate 22 attached to the floor 18 by bolts, one of which is shown at 24. Upper hinge plate 26, fixed as by bolts or welds to front wall 28 of the riser, is pivotally connected by transverse hinge pin 30 to the lower hinge plate 22. Thus, the seat 10 is designed for pivotal movement about the transverse axis of pin 30 from its solid-line upright position to its forwardly tilted easy entry position shown in dashed lines in FIG. 4.

Figure 5:
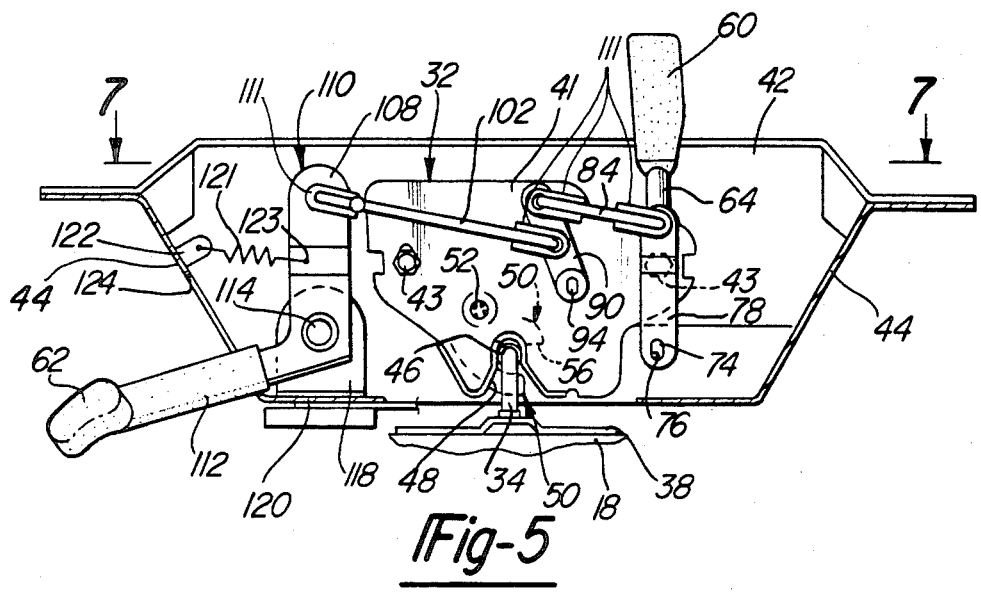
FIG. 5 is a fragmentary cross-sectional view taken on the line 5—5 of FIG. 4 showing the seat lock mechanism structure latch mechanism in its upright latched mode.
Figure 6:
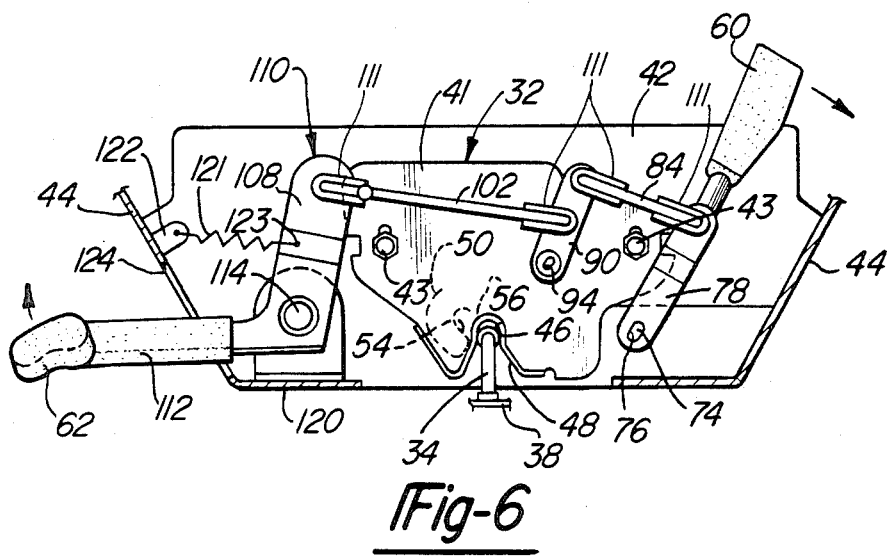
FIG. 6 is a view similar to FIG. 5 showing the seat structure latch mechanism in its upright unlatched mode.

A gas spring assisted latch assembly, generally indicated at 32 in FIGS. 4, 5 and 6, is operative to releasably lock the seat in its upright position. The latch assembly includes a longitudinally extending U-shaped striker 34 fixed to the vehicle body by suitable means such as bolts 36 mounting striker base plate 38 to the floor 18.

The latch assembly 32 includes a transversely extending latch casing 40 fixed on latch plate 41. The plate 41 is mounted to a transverse riser bulkhead 42 by screws 43. The bulkhead 42 has its edges secured to riser side walls 44 by suitable means such as welding. The lower edge of the latch casing 40 has a central striker receiving slot 46 which opens downwardly by a pair of diverging edges 48 effective to cam the striker 34 into the slot 46 upon pivoting the seat rearwardly to its upright position. A conventional ratcheting assembly includes a ratchet 50 pivotally mounted in the casing about a longitudinal rivet 52. The ratchet has a jaw or notch 54 partially shown in dashed lines in FIGS. 5 and 6 and a striker engaging cam edge 56 adapted to overlie slot 46 so as to be engaged by the striker 34 upon returning the seat 10 to its upright position. By swinging the ratchet 50 counterclockwise the ratchet is moved around the striker 34 from its latched position of FIG. 6 to its latched position of FIG. 5, wherein the striker 34 is confined between the ratchet notch 54 and the casing slot 46. The ratchet 50 is resiliently urged to its unlatched position of FIG. 6 to a limit position by means of a coil tension spring (not shown).

Figure 7:
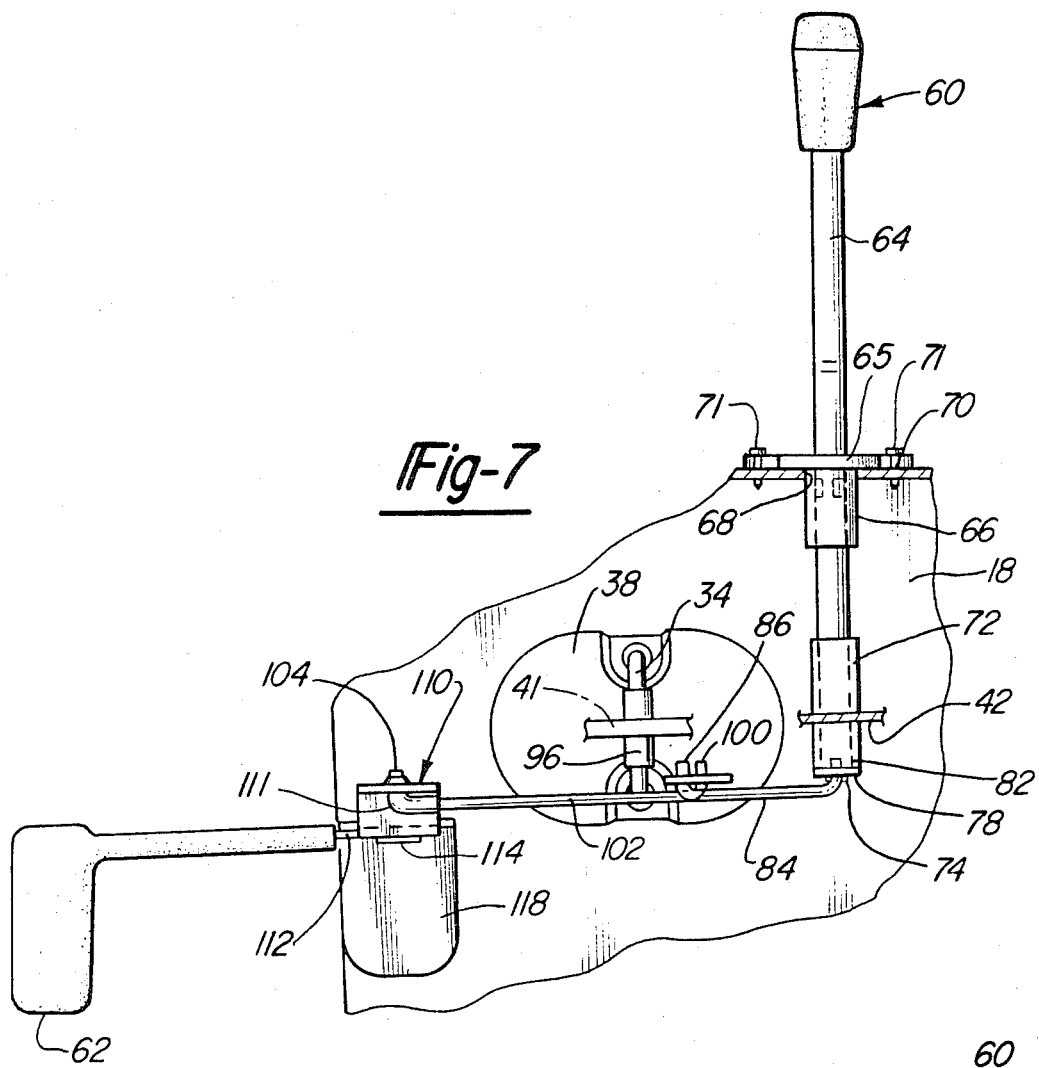
FIG. 7 is a fragmentary elevational view, partly in cross-section, taken on the line 7—7 of FIG. 5.

The latch assembly 32 is unlatched by dual release means providing two release handles. In the preferred embodiment a rear release handle 60 and a side release handle 62 are provided with both handles common to the single latching mechanism as best seen in FIG. 7. Applicants have improved the latch mechanism by providing the side release handle 62 as an additional operating means to readily unlock the latch mechanism by an entering passenger standing outside the vehicle.

As seen in FIG. 7, the rear release handle 60 includes as an assembly a longitudinally extending rod portion 64 supporting an escutcheon plate 64 and bushing 66. The bushing 66 projects through an aperture 68 in riser rear wall 70 and is retained thereon by bolts 71 fixing the escutcheon plate 65 to the wall 70. A sleeve 72, also part of the assembly, is supported on the rod portion 64 through which the forward end of the rod portion 64 protrudes. The release handle rod portion 64 is adapted for pivotal movement about its longitudinal axis in the bushing 66.

Figure 8:
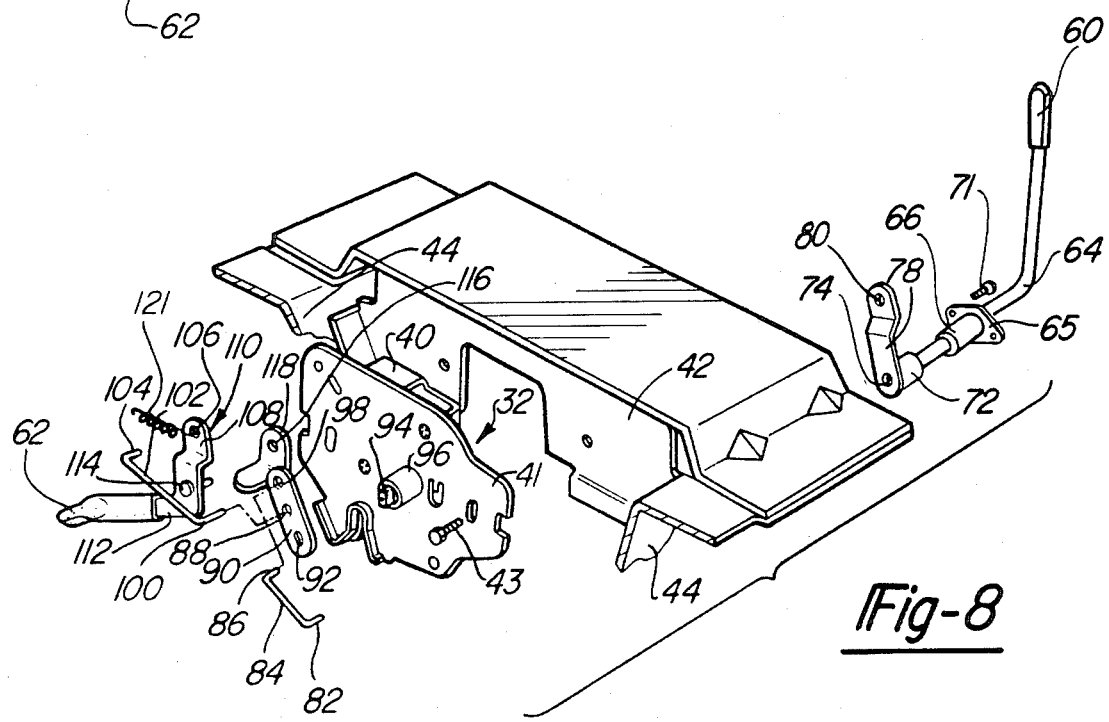
FIG. 8 is a fragmentary exploded perspective view of the seat structure latching mechanism.

It will be noted in FIG. 8 that a flattened end 74 of the rod portion 64 is sized for reception in lower end slot 76 of offset first plate link 78 shown vertically disposed in FIG. 5. The upper end of the link 78 has a hole 80 receiving one end portion 82 of a transversely extending first rod link 84. Opposite end portion 86 of the link 84 is received in a upper end hole 98 of a second plate link 90. The link 90 lower end has a slot 92 receiving the forward flattened end of a pin 94 extending through the casing 40.

The pin 94 extends through and pivots with a bushing portion 96 of the latch mechanism. The second plate link 90 has a mid-point hole 88 receiving bent end portion 100 (FIG. 8) of a second rod link 102. Opposite bent end portion 104 of the second rod link is received in hole 106 of a first vertically disposed fixed arm 108 of a bell-crank lever 110. It will be noted in FIGS. 5 and 6 that conventional snap-in plastic end fittings 111 are provided on each end of the first and second rod links 84 and 102. For the purpose of clarity only one plastic end fitting 111 has been shown in FIG. 7.

The side release handle 62 is attached at an obtuse angle of about 110 degrees to a second arm 112 of the bell-crank lever. The side release handle 62 is attached to a second arm 112 of the bell-crank lever. The bell-crank lever 110 is pivoted at the juncture of its arms 108 and 112 about a bell crank longitudinally extending pivot pin 114 received in hole 116 of angle bracket 118. As seen in FIG. 5 the angle bracket 118 has its horizontal base leg mounted on riser bottom wall 120. The bell-crank lever 110 has its vertically disposed first arm 108 connected to adjacent riser outboard side wall 44 by a single pre-loading helical tension coil spring 121. The spring 121 has one end fixed to a bracket 122 mounted on outboard side wall 44, and its other end hooked in hole 123 of the first arm 108. Thus, the bell-crank lever 110 is urged by the spring 121 for rotation about its pivot pin 114 biasing the first arm 108 to its vertically disposed position of FIG. 5 while its second arm 112 extends at a downwardly inclined angle through slotted opening 124 in the riser outboard side wall 44. It will be noted that the single pre-loading spring 121 also biases the rear release handle 60 to its upright locked position shown in FIG. 5 by means of loading the series of rod links 84, 102, and plate links 78 and 90 together with their pivots.

As seen in FIGS. 1, 2 and 3 an extensible and retractable actuator in the form of a self-contained pneumatic cylinder referred to as a "gas spring" or a "gas prop" is generally indicated at 130. The gas spring actuator 130 includes a piston rod 132 having a piston (not shown) in its inner end slidably received within a sealed tube or cylinder 134. A gas spring resembles a hydraulic cylinder with a rod, tube, piston and seals. However, unlike a hydraulic cylinder, the gas spring actuator 130 has an orifice in the piston and has no external porting. The gas spring actuator 130 is essentially a sealed cylinder containing a pressurized inert gas and a small amount of oil. The orifice within the piston assures equal pressure on each face of the piston at all static positions. A helical compression spring (not shown) may be located within the cylinder 134 to provide an initial mechanical spring biasing force causing the seat structure to pop-up an initial distance on the order of four inches. The purpose of the helical spring force is to insure that the latch initially clears the striker 34 under all conditions, such as during low temperatures wherein the actuator 130 may be sluggish.

An example of a typical gas spring, suitable for use with the present invention, may be purchased from the Gas Spring Company, a division of Fichtel and Sachs Industries, Inc. It is understood, however, that other types of gas spring actuators may be used with the present invention without departing from the concept of the present invention. The U.S. Pat. No. 4,646,884 issued Mar. 3, 1987 to Yang and entitled Extended Life Gas Spring discloses one form of gas spring actuator the disclosure of which is incorporated by reference herein.

As best seen in FIG. 3 the cylinder 134 has its one forward end provided with a first or forward ball socket end fitting 136 pivotally engaging a ball stud 138 including a threaded shank 139 secured by a nut 140 to the riser inboard side wall 44. A second or rearward ball socket end fitting 142 is fixed to the outer end of the rod 132. The rearward end fitting 142 pivotally engages a second ball stud 144 suitably affixed to the vertical flange 146 of an angle-bracket 148 as by welds 150. The angle-bracket 148 has its horizontal flange 152 suitably secured to the vehicle body floor 18 as by welds (not shown). It will be noted in FIG. 4 that the pivot ball stud 144 is located rearwardly of the striker 34 and a predetermined vertical distance below the forward ball socket fitting 138.

In operation, for the passenger to incline the seat 10 forwardly to provide an entrance to the rear seat area, the latch ratchet 50 is operated to release the striker 34 by manually lifting the side 62 handle. As a result the gas spring 130, which is held in its fully retracted position with the seat 10 locked in its FIG. 1 upright mode, urges the seat 10 to rotate about the hinge pivot pin 30 to its forwardly tilted overcenter mode shown in FIG. 2. In the disclosed form, as seen in FIG. 4, the seat riser bottom wall 120 is rotated from its solid line latched position through an angle of about 45 degrees to its forwardly inclined dashed-line easy enter mode. To accomplish this the gas spring actuator 130 is rotated through an angle of about 15 degrees so as to be extended a predetermined distance as shown by its dashed-line position.

It will be noted in FIG. 4 that stop means, generally indicated at 160, are provided on the riser front wall. The stop means 160 are shown in the form of an angle bracket having a base leg 162 fixed to the upper hinge plate 26 and its free forwardly projecting leg 164 provided with an elastomeric stop 166. The stop 166 is adapted to contact the vehicle floor as the gas spring actuator 130 reaches its static predetermined extended position. With the seat in its forwardly tilted dashed line position of FIG. 4 it will be seen that the center of gravity (c.g.) 168 of the seat structure 10 is to the left or overcenter relative to the pivotal axis of hinge pin 30.

The gas spring thus exerts a force by means of a predetermined gas pressure providing a controlled rate of extension to rotate the weight of the seat structure to its overcenter stop position. Thus, the gas spring static extended position prevents the seat structure from being accidently returned to its upright position. This gas spring force is designed to maintain the seat structure 10 in its forwardly inclined position even if the vehicle is parked on an upward incline or grade. When parked at an upward incline a plumb or vertical line from the seat structure center of gravity 168 may intersect the vehicle floor to the right of the hinge pin 30 pivot axis wherein the c.g. 168 is not overcenter.

While a specific embodiment of the invention has been shown and described in detail to illustrate the application of the principles of the invention, it will be understood that the invention may be embodied otherwise without departing from such principles. Thus, for example, the invention could be incorporated in a seat structure having a forward and rearward adjustable seat track arrangement intermediate the seat riser and the seat cushion support.

What is claimed is:

1. In a vehicle a seat structure including a seat back connected to a seat cushion, a seat riser mounted on the underside of the cushion, said seat riser pivotally mounted on a vehicle floor for rotation from a first seat structure upright position, wherein said riser is releasably latched to the floor by a latch mechanism operable to be released by a first seat latch release handle, said seat riser adapted to be rotated upon operation of said first release handle to a second seat structure forwardly tilted stop position wherein said riser is inclined to the floor, the improvement comprising:

a gas spring assisted latch assembly operative upon release of said latch mechanism for pivoting said seat structure from said upright position to said forwardly tilted position allowing easy access to the vehicle area rearwardly of said seat structure;

said gas spring actuator being extensible and retractable and constantly biased to an extended position, said gas spring actuator having its one end pivotally connected to said seat riser and its other end pivotally connected by bracket means to said vehicle floor;

a second side latch release handle adopted to release said latch mechanism, said second handle projecting outboard from said seat riser, whereby upon either said first or second release handle being operated resulting in release of said latching mechanism;

said gas spring actuator operative, upon release of said latch mechanism, to expand rotating said seat structure to said stop position and maintaining said seat structure in said stop position without passenger assistance until said seat structure is manually returned to said upright latched position by retracting said gas spring actuator under pressure and re-engaging said latch mechanism.

2. The vehicle seat structure as set forth in claim 1, wherein said gas spring being pivotally mounted to said vehicle floor by a hinge having a transverse hinge pin located at the forward end of said riser adjacent to said floor, said gas spring actuator having said one end pivotally connected to said seat riser at a location vertically disposed a predetermined distance above said hinge pin, said gas spring having said other end pivotally connected to said bracket means rearwardly of said latching means.

3. The vehicle seat structure as set forth in claim 2, wherein said second side latch release handle in the form of a spring biased L-shaped bell crank lever and link member, said bell crank lever having first and second arms disposed at an obtuse angle, said bell crank lever pivotally mounted on said seat riser at the intersection of said arms for rotational movement about a first longitudinally extending axis, said bell crank lever first arm extending outboard from said seat riser and said second arm extending upwardly, said first arm having said side release handle mounted on the free end thereof, said link member interconnecting said latch mechanism with said second arm, and single pre-loading spring means biasing said bell crank lever about said first longitudinal axis to its latched position, said single spring means also biasing said first seat latch release handle about a second longitudinally extending axis to its latched position by a plurality of interconnected pivoting link means.

4. The vehicle seat structure as set forth in claim 3, wherein said single spring means in the form of a single helical tension spring connected between a riser side wall and said bell crank lever first arm.

* * * * *